United States Patent
Sutardja

[19]

[11] Patent Number: 5,831,456
[45] Date of Patent: Nov. 3, 1998

[54] APPARATUS AND METHOD FOR TRANSIENT SUPPRESSION IN SYNCHRONOUS DATA DETECTION SYSTEMS

[75] Inventor: Pantas Sutardja, San Jose, Calif.

[73] Assignee: Marvell Technology Group, Ltd., Hamilton, Bermuda

[21] Appl. No.: 848,525

[22] Filed: Apr. 28, 1997

[51] Int. Cl.[6] .................................................. H03K 17/00
[52] U.S. Cl. ........................ 327/100; 327/155; 327/559; 375/345; 375/376
[58] Field of Search .................................. 327/100, 551, 327/552, 559, 155, 156; 375/345, 373, 376

[56] References Cited

U.S. PATENT DOCUMENTS 5,559,836  9/1996  Nishijima ................................. 327/100
5,638,409  6/1997  Awata et al. ............................. 375/376

OTHER PUBLICATIONS

Cideciyan, Roy D., Dolivo, Francois, Hermann, Reto, Hirt, Walter and Schott, Wolfgang, A PRML System for Digital Magnetic Recording, IEEE Journal on Selected Areas in Communications, vol. 10, No. 1, Jan. 1992, pp. 38–56.

*Primary Examiner*—Kenneth B. Wells
*Attorney, Agent, or Firm*—Fenwick & West LLP

[57] ABSTRACT

Disclosed is a method for transient suppression in synchronous data protection systems which includes high-pass filtering of the signal produced by the sampling and shaping circuits before the signal enters the timing and gain control circuits. This high-pass filtering may be turned on when a transient is detected, in anticipation of a previously detected transient, or may be always on. Using the high-pass version of the shaped signal allows the timing loop and the gain loop to function during a transient interval, thus maintaining timing and gain lock during such an interval.

14 Claims, 13 Drawing Sheets

APPARATUS AND METHOD FOR TRANSIENT SUPPRESSION IN SYNCHRONOUS DATA DETECTION SYSTEMS

BACKGROUND OF THE INVENTION

1. Technical Field

This invention relates to transient suppression techniques in synchronous data detection systems. These techniques are applicable for robust gain control, timing, and data recovery in a read channel of a magnetic recording system.

2. Description of Related Art

The magnetic storage industry has been increasing the areal density storage capacity of hard drives with various technological advancements to meet the computer industry's demand for more and better storage. Such advancements include the use of magnetoresistive (MR) heads and partial-response maximum likelihood (PRML) sequence detection. A MR head includes a MR element made out of a material which changes electrical resistance depending on the strength of the magnetic field in which it lies. A PRML system is a synchronous data detection system which includes partial-response signalling and maximum likelihood sequence detection.

MR heads are known in the industry to suffer from a transient phenomenon commonly referred to as thermal asperity (TA) events. A MR head normally glides over a spinning magnetic disk close to, but not touching, the disk surface. When a MR head hits a protruding object on the disk surface, the MR element heats up rapidly and the heat decays relatively slowly.

The effect of such a transient phenomenon is a sudden transient change in the baseline of the read-back signal coming from the MR head. This transient change contains a substantial low frequency component and causes loss of read-back data.

The extent of the read-back data lost due to such a transient depends on the robustness of the data detection system. A data detection system without any transient detection and suppression circuit may lose a large amount of data, even to the point that the error correcting code (ECC) used in the recording system cannot regenerate the user data.

A prior art method of handling a transient includes the following steps. First, the system detects the transient and halts data detection. Second, an analog front-end portion of the system is switched to high-pass mode to reduce the effect of the transient. Third, the system freezes both the gain of the gain control loop and the timing of the timing recovery loop. Fourth, the system waits for a period of time until the effect of the transient is below some threshold. This period of time is called the transient interval. Fifth, when the transient interval is over, the system resumes data detection. Sixth, the front-end is switched back to a lower AC coupling and the gain and timing are unfrozen.

There are at least two problems with the prior art method. First, even with the front-end high-pass function switched on, the transient interval is still quite long. Such a long transient interval may result in a loss of read-back data beyond the point of recovery by the ECC. Second, freezing the timing recovery and gain control loops means that the system halts tracking the timing and gain variations in the read-back signal. If the channel timing is not fully settled when the system is hit with a TA event, then freezing the timing loop will cause a large drift in the synchronous sampling points which may result in permanent synchronization loss and complete loss of user data. This problem has been shown both experimentally and through modelling.

SUMMARY

The present invention relates to a system and method for transient suppression in a synchronous data detection system. The present invention includes high-pass filtering of the signal produced by the sampling and shaping circuits before the signal enters the timing and gain control circuits. This high-pass filtering may be turned on when a transient is detected, in anticipation of a previously detected transient, or may be always on. Using the high-pass version of the shaped signal allows the timing loop and the gain loop to function during a transient interval, thus maintaining timing and gain lock during such an interval.

This high-pass filtering of the signal entering the timing and gain control circuits facilitates the tracking of the timing and gain variations in the read-back signal. The resulting improvements in tracking capability reduces the necessary length of the transient interval which shortens the time period during which tracking is halted. A shorter time during which tracking is halted leads to less read-back data loss and smaller drift in the synchronous sampling points. Thus, loss of read-back data beyond the point of recovery by ECC and permanent synchronization loss are prevented.

BRIEF DESCRIPTION OF THE DRAWINGS

These and other more detailed and specific objects and features of the present invention are more fully disclosed in the following specification, reference being had to the accompanying drawings, in which.

DESCRIPTION OF THE PREFERRED EMBODIMENT

Figure 1A:
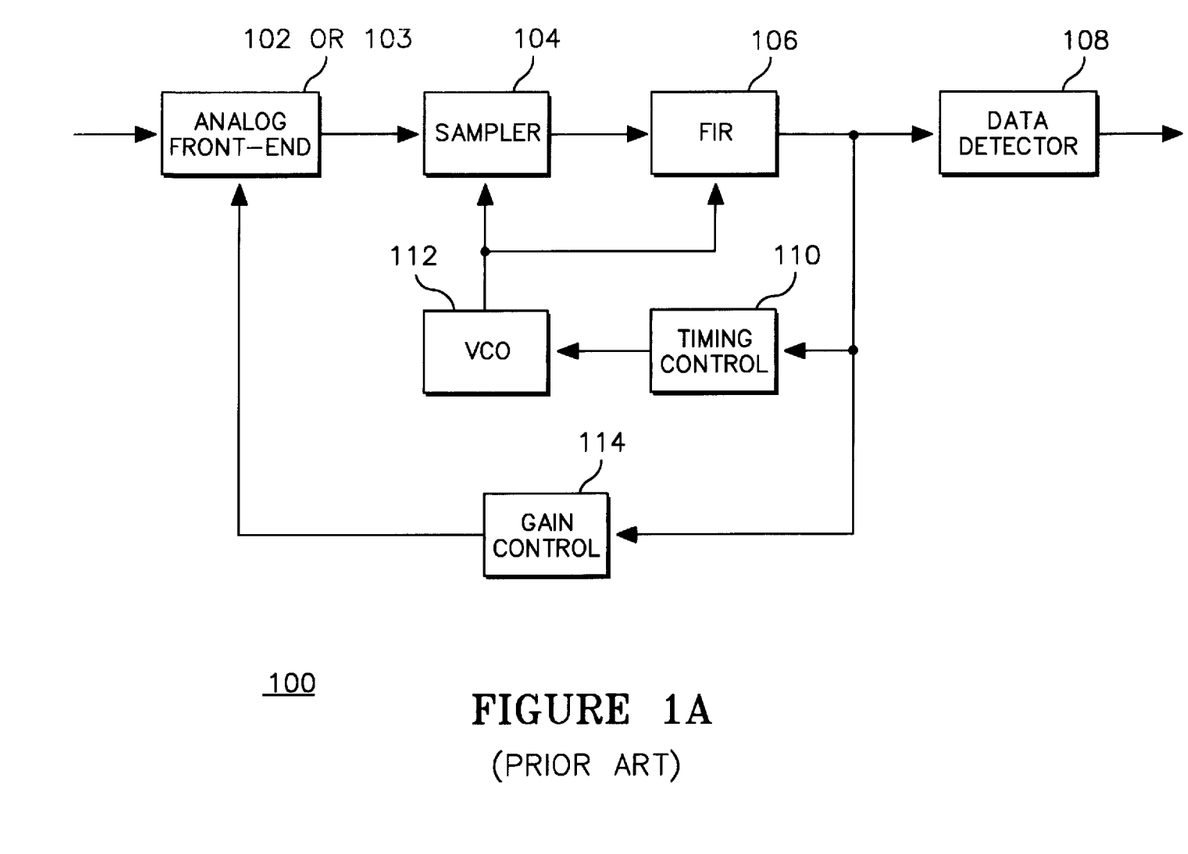
FIG. 1A is a diagram of a first prior art synchronous data detection system.

FIG. 1A is a diagram of a first prior art synchronous data detection system 100. Analog Front-End portion 102 or 103 receives an analog signal. In a typical magnetic storage system, this signal comes from the magnetic head. A constant signal level is desirable. Therefore, the analog front-end 102 or 103 typically contains a variable gain amplifier (VGA) 120 circuit. To keep the signal level constant, the VGA 120 receives a control signal from the gain control circuit 114. The analog front-end 102 or 103 outputs an amplified signal.

Sampler circuit 104 receives the amplified signal from the analog front-end 102 or 103. The sampler 104 may be an Analog-to-Digital Converter (ADC). The sampling is controlled by a clock signal output by a voltage controlled oscillator (VCO) 112. The frequency and phase of the clock signal output by the VCO 112 is controlled by a timing control circuit 110. If the sampler 104 is an ADC, the sampler 104 outputs a stream of digital samples. The sampler 104 may also be a sample-and-hold (SH) circuit. If the sampler 104 is a SH, it outputs a stream of analog samples.

Finite Impulse Response (FIR) filter 106 receives the output signal of the sampler 104. The FIR filter 106 shapes the sampled signal so that it is suitable for input into a data detector 108.

The data detector 108 receives the shaped signal from the FIR 106. The data detector 108 could be a simple threshold detector, but a maximum likelihood sequence detector (i.e. a Viterbi detector) would provide better detection capability.

Figure 1B:
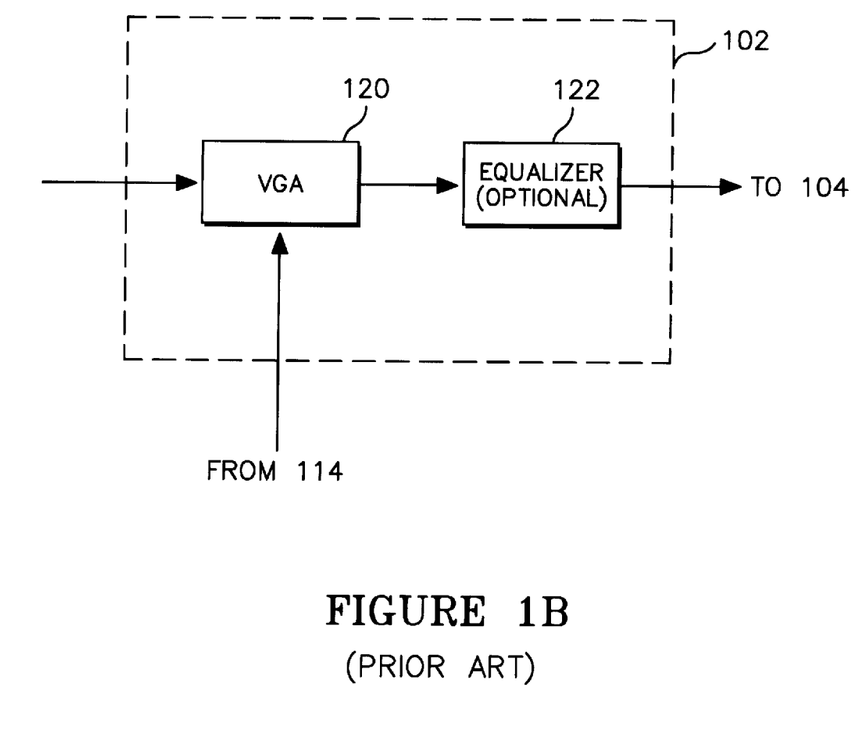
FIG. 1B is a diagram of a first analog front-end circuit for the first prior art synchronous data detection system.

FIG. 1B is a diagram of a first analog front-end circuit 102 for the first prior art synchronous data detection system 100. The variable gain amplifier (VGA) 120 receives an analog read-back signal containing read-back data and amplifies the signal by an amount determined by a control signal received from the gain control circuit 114. The amplified signal output by the VGA may be input into an (optional) analog equalizer 122. Such an equalizer 122 is a filter which modifies the shape of the signal and is optional because a similar function is performed after sampling by the FIR filter 106.

Figure 1C:
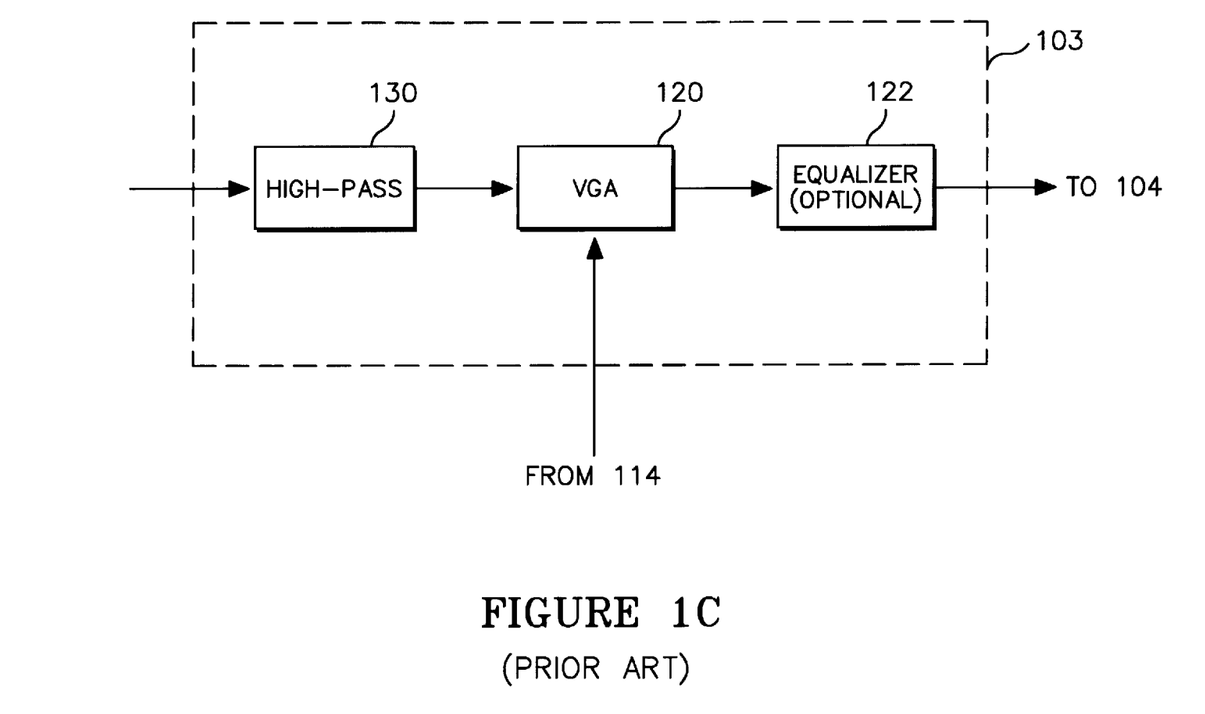
FIG. 1C is a diagram of a second analog front-end circuit, including a high-pass filter, for the first prior art synchronous data detection system.

FIG. 1C is a diagram of a second analog front-end circuit 103, including a high-pass filter 130, for the first prior art synchronous data detection system 100. The high-pass filter 130 receives an analog read-back signal and filters out lower frequency components of the signal before outputting the signal to the VGA 120. Such high-pass filtering reduces the effect of a thermal asperity event on the baseline of the read-back signal but also distorts the read-back signal.

Figure 1D:
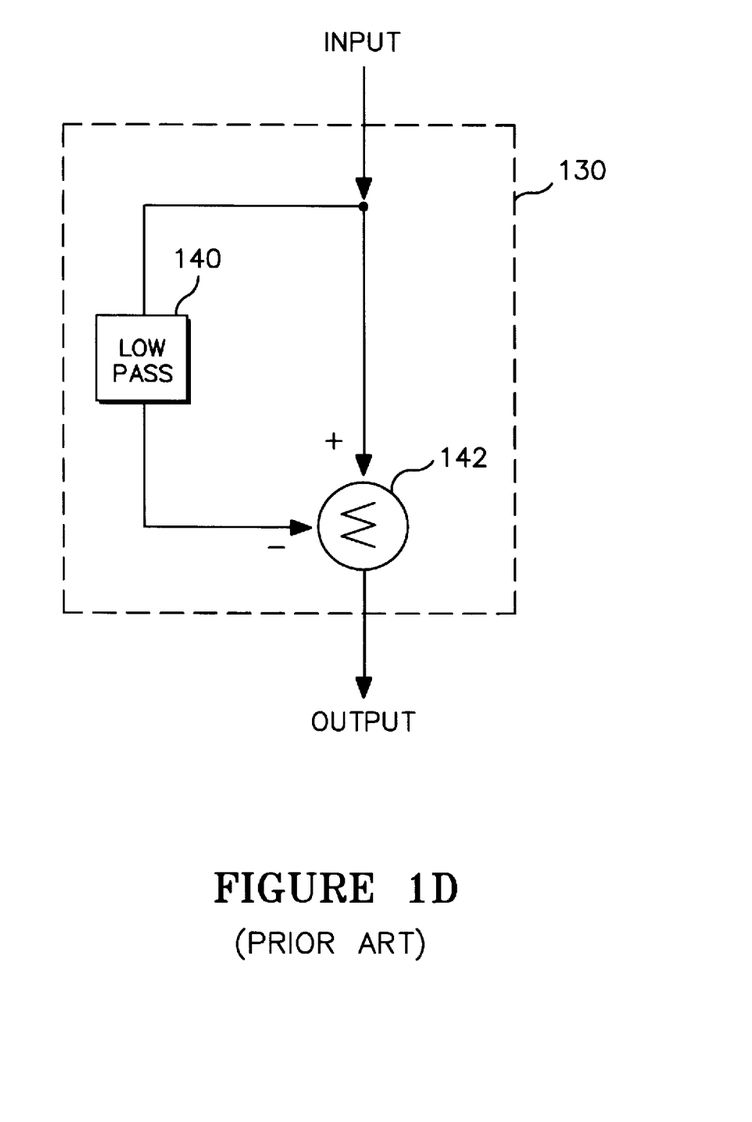
FIG. 1D is a diagram of a high-pass filter.

FIG. 1D is a diagram of a high-pass filter 130. The input of the high-pass filter 130 splits into two signal paths. The signal along the first path goes through a low-pass filter 140 and this is subtracted from the signal along the second path in a summation device 142. The output of the summation device 142 is output by the high-pass filter 130.

Figure 2A:
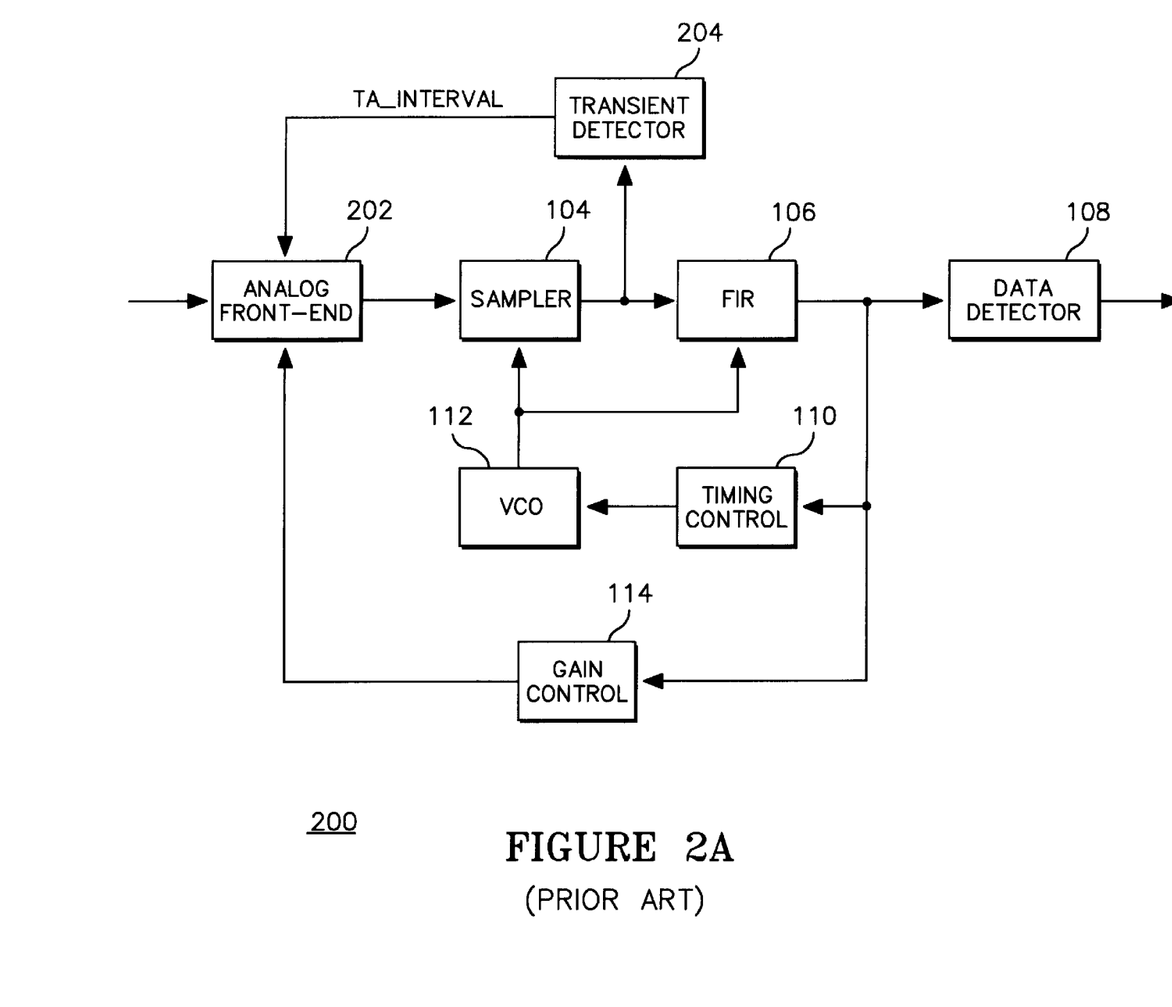
FIG. 2A is a diagram of a second prior art synchronous detection system, including a transient detector.

FIG. 2A is a diagram of a second prior art synchronous detection system 200, including a transient detector 204. The second system 200 is similar to the first system 100, but in the second system 200 the sampled signal output by the sampler 104 is input into the transient detector 204 (in addition to being input into the FIR 106). The transient detector 204 detects the presence of transients, such as thermal asperity events, in the sampled signal and outputs a TA__interval signal which indicates the duration of the transient.

In addition, the second system 200 includes a third analog front-end circuit 202 which receives the TA__interval signal from the transient detector 204. The TA__interval signal controls a bypassable high-pass filter 210 in the third analog front-end circuit 202.

Figure 2B:
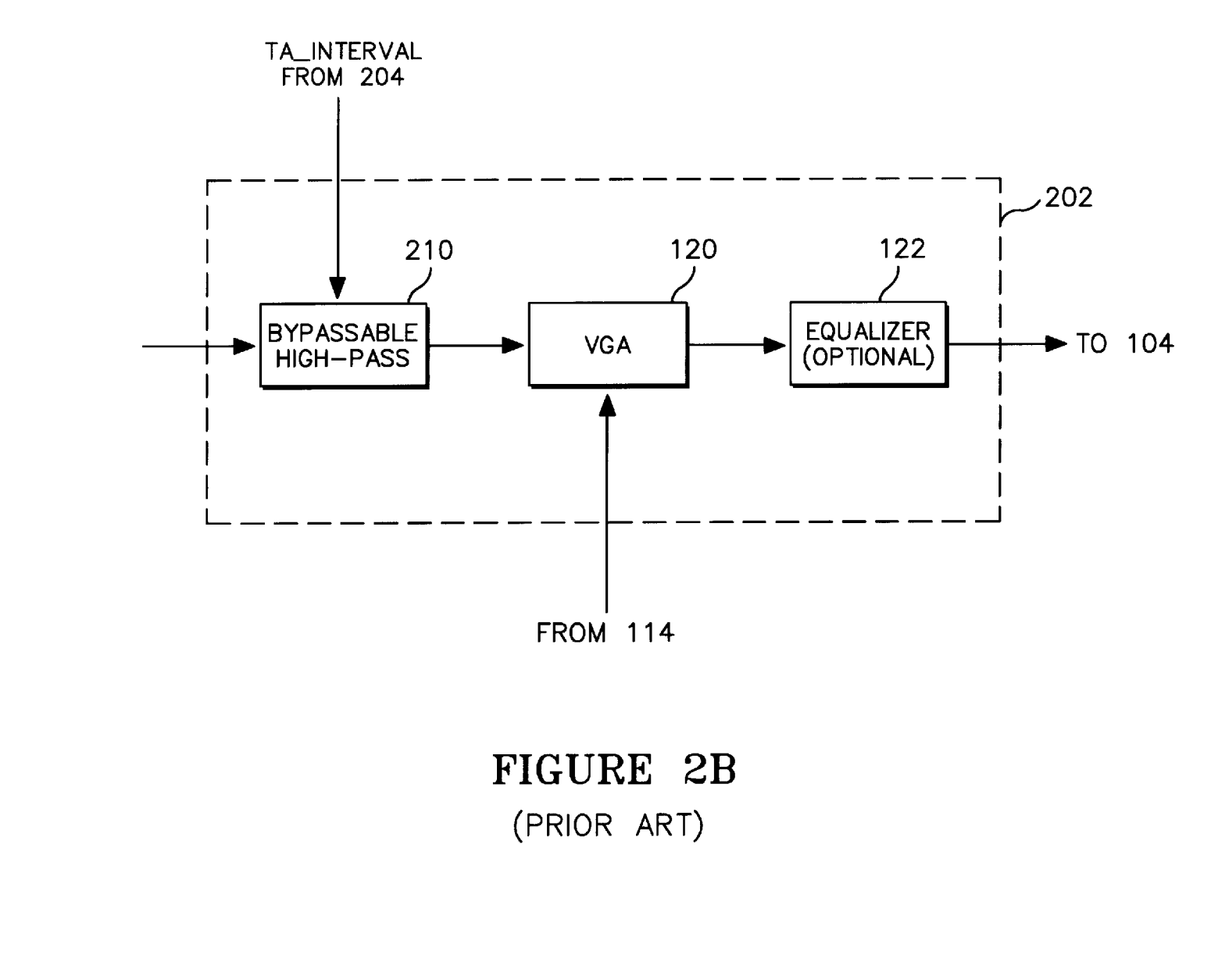
FIG. 2B is a diagram of an analog front-end circuit, including a bypassable high-pass filter, for the second prior art synchronous detection system.

FIG. 2B is a diagram of an analog front-end circuit 202, including a bypassable high-pass filter 210, for the second prior art synchronous detection system 200. The bypassable high-pass filter 210 receives an analog read-back signal and high-pass filters the signal if the TA__interval signal received from the transient detector 204 indicates to do so based on the presence of a transient. The output of the bypassable high-pass filter is received by the VGA 120.

Figure 2C:
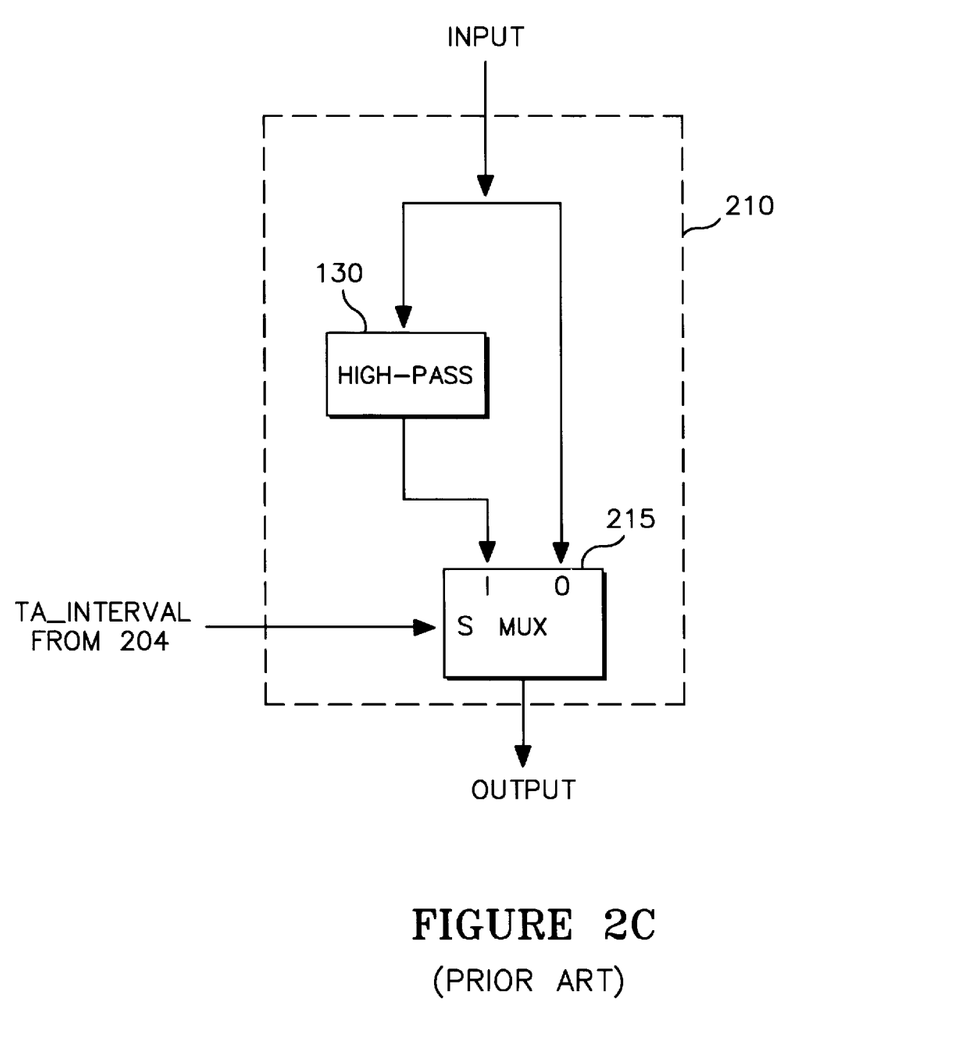
FIG. 2C is a diagram of a bypassable high-pass filter.

FIG. 2C is a diagram of a bypassable high-pass filter 210. The input of the bypassable high-pass filter 210 splits into two signal paths. The signal along the first path goes through a high-pass filter 130 before going into the first input (1) of a 2:1 multiplexer (MUX) 215. The signal along the second path goes into the second input (0) of the 2:1 MUX 215. The selection input (S) for the 2:1 MUX 215 is the TA__interval signal received from the transient detector 204 such that the first input (1) is output during the transient interval and the second input (0) is output otherwise.

Figure 2D:
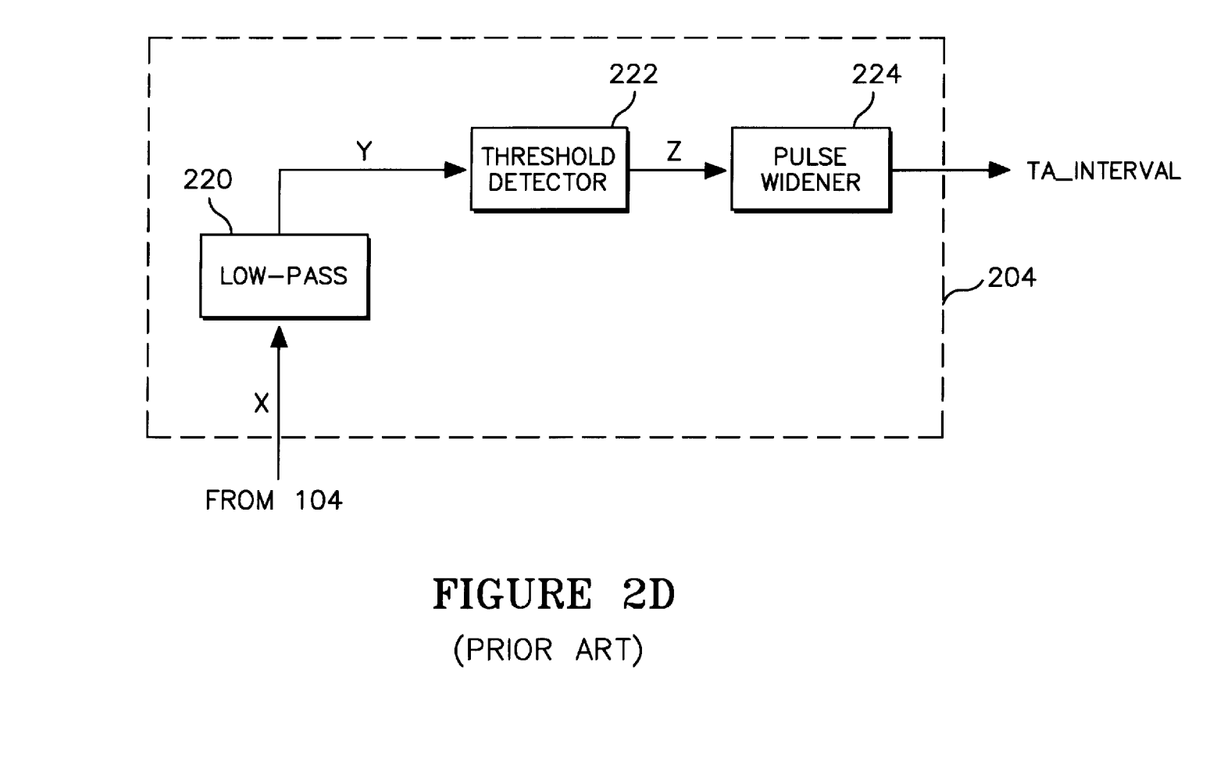
FIG. 2D is a diagram of a transient detector.
Figure 2E:
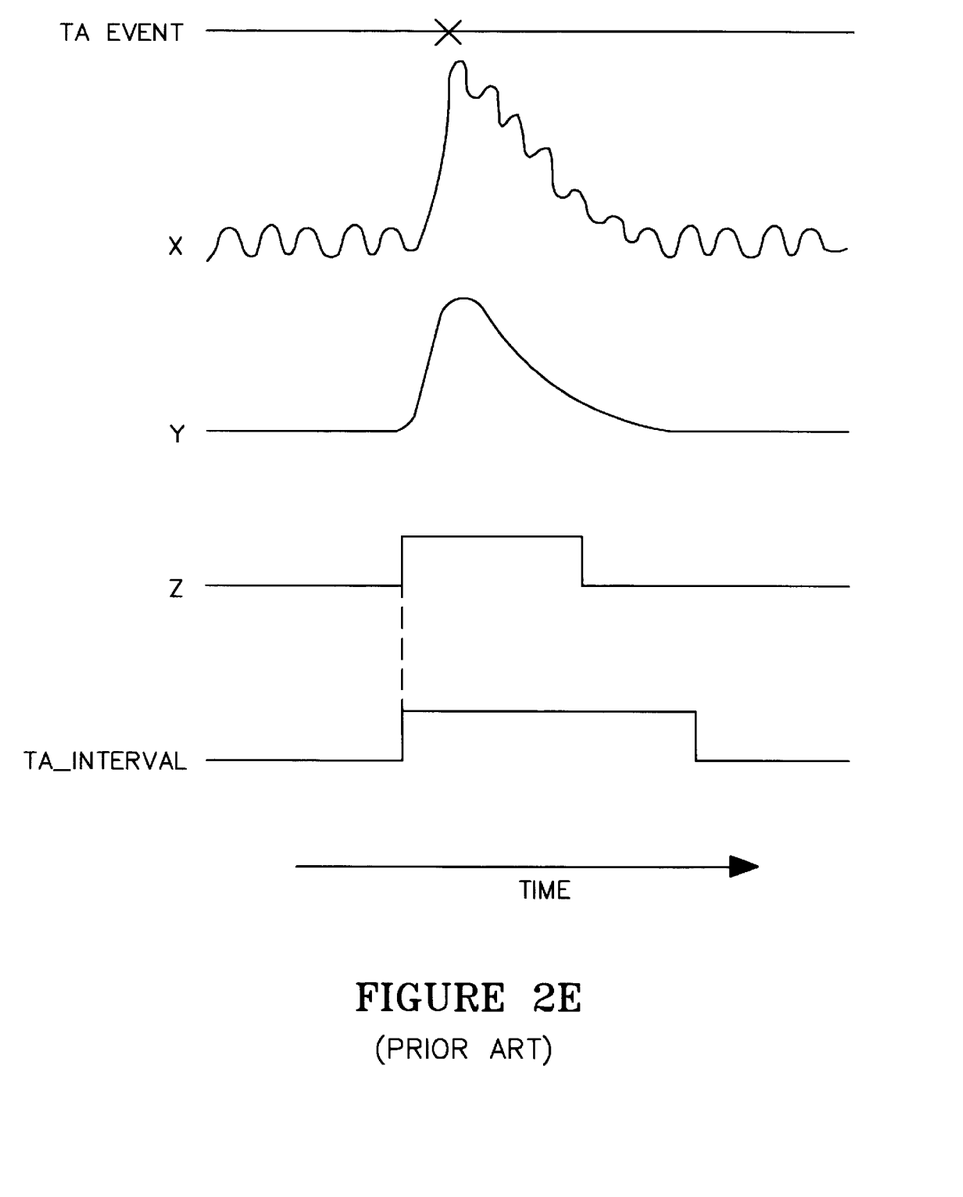
FIG. 2E shows illustrative graphs of various signals in the transient detector.

FIG. 2D is a diagram of a transient detector 204. In conjunction with FIG. 2D, FIG. 2E shows illustrative graphs of various signals in the transient detector 204.

A low-pass filter 220 receives the sampled signal x from the sampler 104. A sampled signal x is shown for purposes of illustration in FIG. 2E. (Note that in actuality the signal x and subsequent signals should be sampled rather than continuous as shown in the illustration.) The "oscillations" in the illustration indicate the read-back data cells in the signal x. Near the time of a TA event, the signal x spikes up, and it is several cells before the effect of the TA event fades away from the signal x.

The low-pass filter 220 removes the higher frequency components from the signal x and outputs a low-pass filter y. The low-pass signal y is shown for purposes of illustration in FIG. 2E. As shown in the illustration, the read-back data information is generally removed by the low-pass filtering, leaving only the effect on the signal from the TA event.

The threshold detector 222 receives the low-pass signal y and outputs a threshold signal z. The threshold signal is shown for purposes of illustration in FIG. 2E. As shown in the illustration, the threshold signal z is low if the low-pass signal y is below a predetermined threshold, and is high if the low-pass signal is above the predetermined threshold.

The pulse widener 224 receives the threshold signal z and outputs a "thermal asperity interval" (TA__interval) signal. The TA__interval signal is shown for purposes of illustration in FIG. 2E. As shown in the illustration, the TA__interval begins low like the threshold signal z, goes high when the threshold signal z becomes high, but does not go back low until substantially after the threshold signal z goes back low. The purpose of this widening of the pulse is to allow enough time for the transient produced by the TA event to decay to an amplitude sufficiently small in comparison to the amplitude of the normal read-back date signal (i.e., the amplitude of the "oscillations" in the sampled signal x).

Figure 3A:
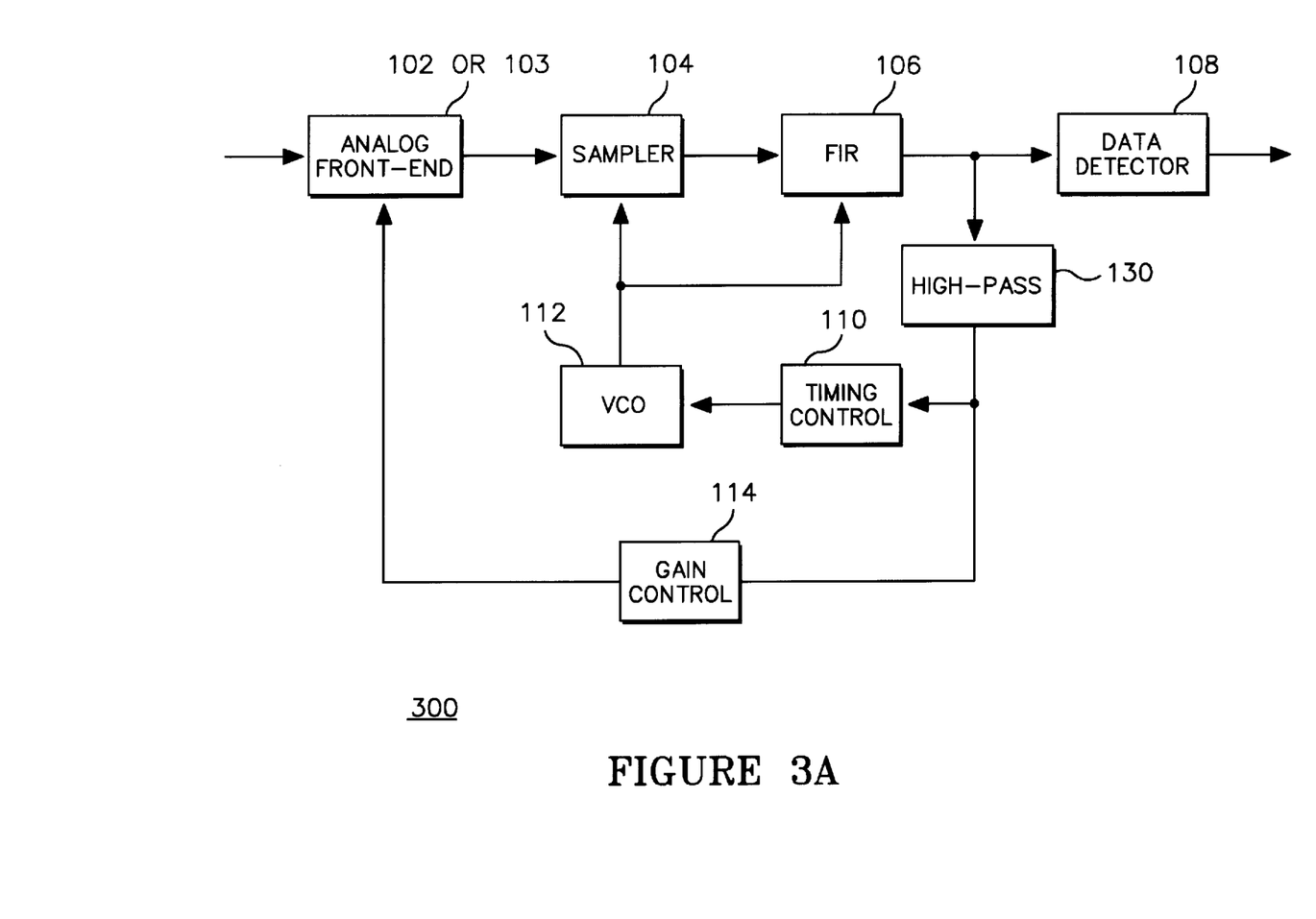
FIG. 3A is a diagram of a third synchronous data detection system, including a high-pass filter, in a first and alternate embodiment of the present invention.
Figure 3B:
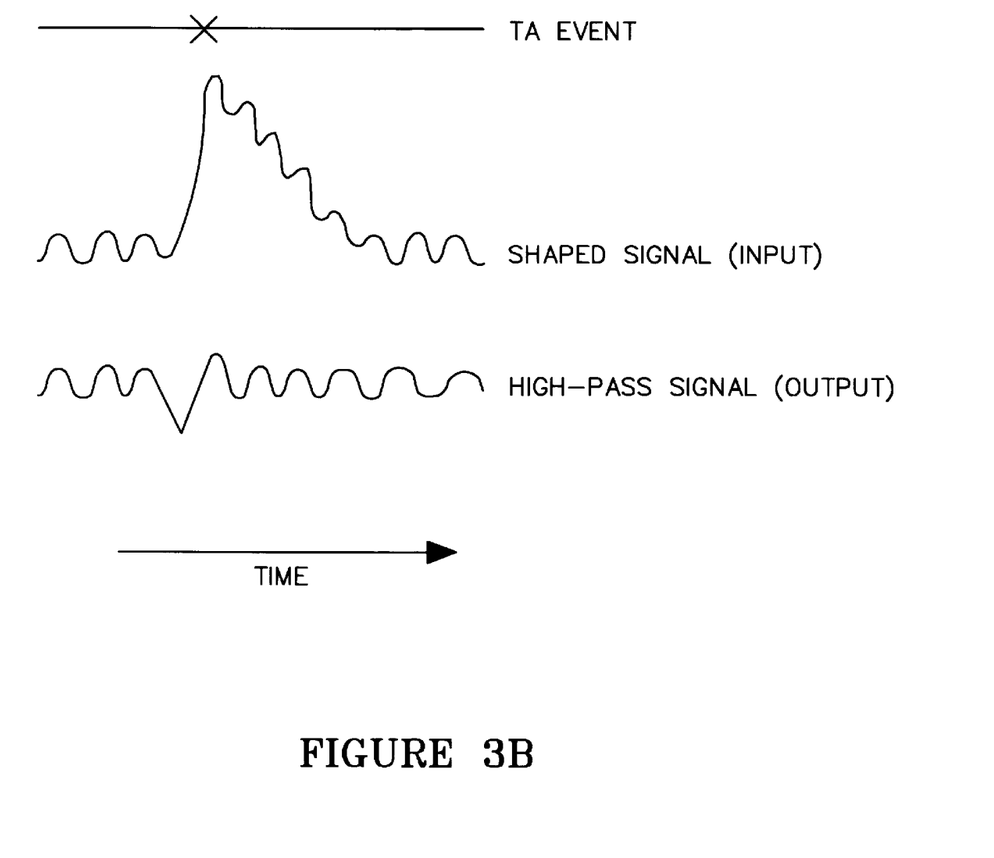
FIG. 3B shows illustrative graphs of the input and output of the high-pass filter in the third synchronous data detection system.

FIG. 3A is a diagram of a third synchronous data detection system 300, including a high-pass filter 130, in a first and alternate embodiment of the present invention. In conjunction with FIG. 3A, FIG. 3B shows illustrative graphs of the input and output of the high-pass filter 130 in the third synchronous data detection system 300.

The third system 300 adds to the first system 100 a strategically placed high-pass filter 130. The high-pass filter 130 receives the shaped signal from the FIR filter 106, and outputs a high-pass signal to the timing control circuit 110 and to the gain control circuit 114. As illustrated in FIG. 3B, the effect of the TA event is present in the shaped signal but is substantially removed from the high-pass signal.

The removal of the effect of the transient from the signal entering the timing 110 and gain 114 control circuits facilitates the tracking of the timing and gain variations in the read-back signal. If the effect of the transient is not removed from the signal, then the effect of the transient throws off the phase-locked loop (PLL) of the timing control circuit 110 and the gain adjustment scheme of the gain control circuit 114.

Figure 4:
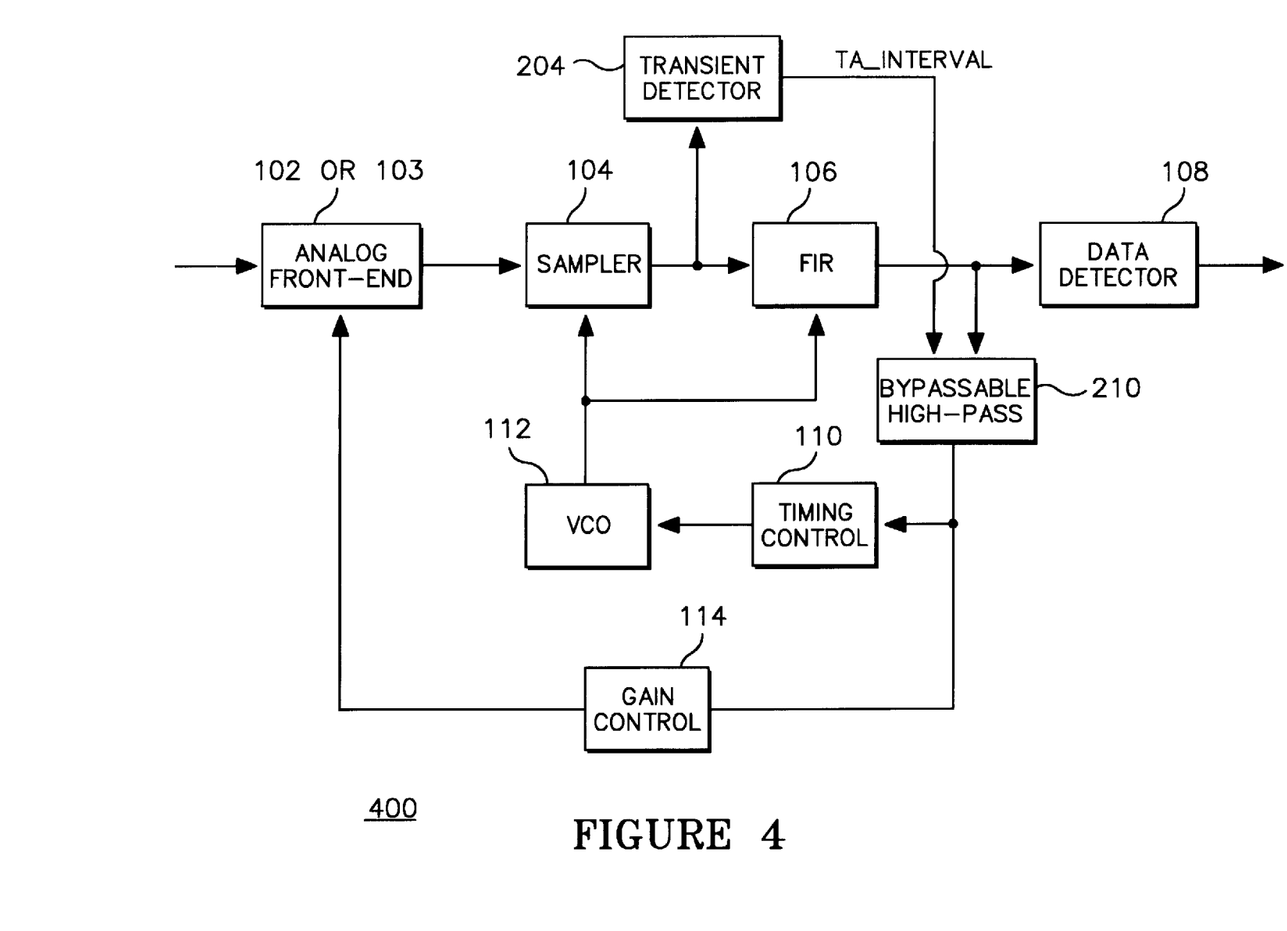
FIG. 4 is a diagram of a fourth synchronous data detection system, including a bypassable high-pass filter, in a second and preferred embodiment of the present invention.

FIG. 4 is a diagram of a fourth synchronous data detection system 400, including a bypassable high-pass filter 210, in a second and preferred embodiment of the present invention. The fourth system 400 adds to the first system 100 a transient detector 204 and a strategically placed bypassable high-pass filter 210. The transient detector 204 receives the sampled signal from the sampler 104 and outputs a TA_interval signal which indicates when the read-back signal is affected by a transient. The bypassable high-pass filter 210 receives the shaped signal from the FIR 106 and sends its output to the timing 110 and gain 114 control circuits. The TA_interval signal controls the bypassable high-pass filter 210 such that the high-pass filtering is switched on (i.e., the first input (1) is selected by MUX 215 in FIG. 2C) during the time when there is substantial effect by the transient in the read-back signal (i.e., when the TA_interval signal is high).

In this way, switching on the high-pass filtering substantially removes the effect of the transient from the signal entering the timing 110 and gain 114 control circuits. This facilitates the tracking of the timing and gain variations during the transient interval.

Figure 5:
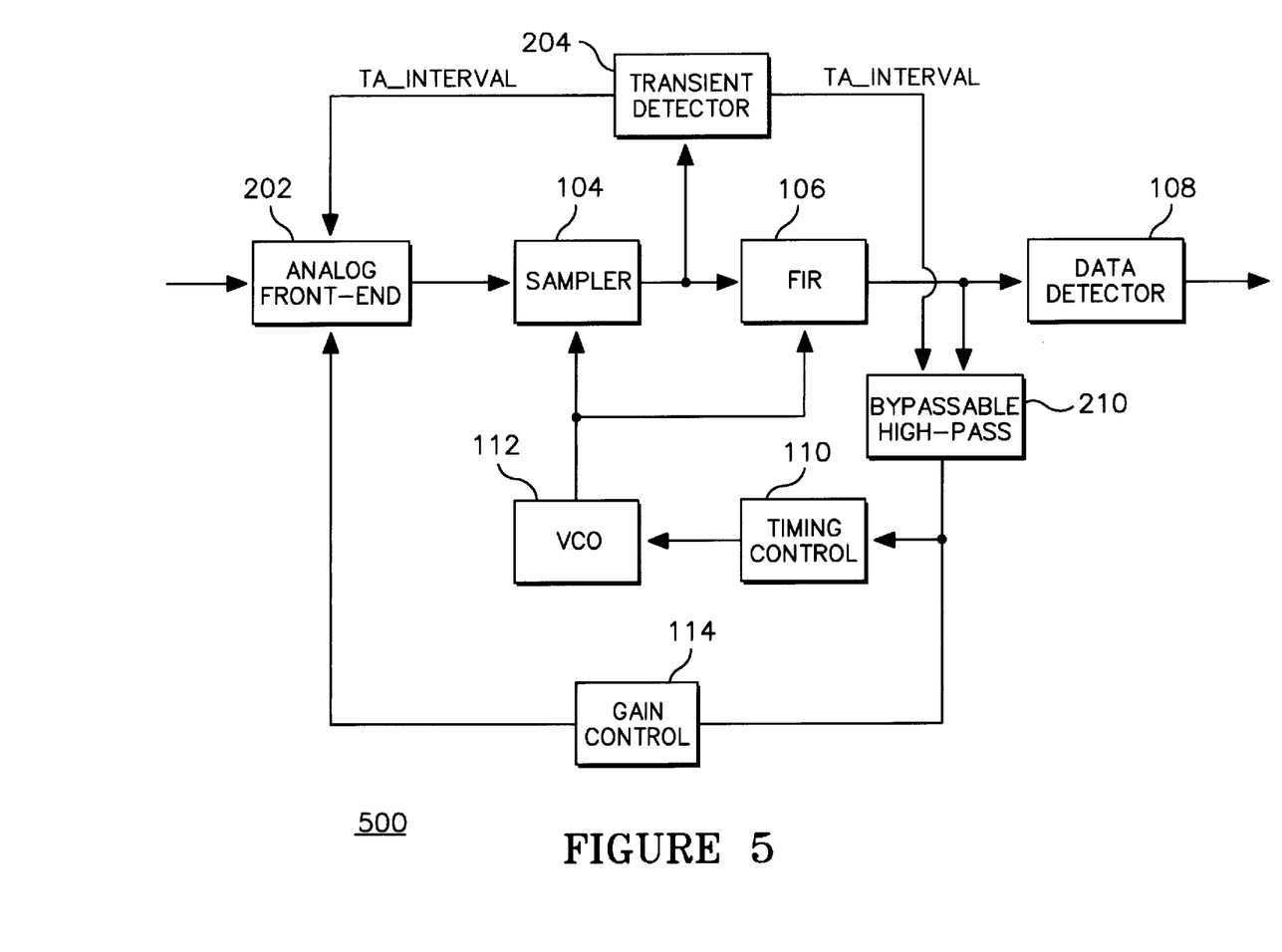
FIG. 5 is a diagram of a fifth synchronous data detection system in a third and alternate embodiment of the present invention.

FIG. 5 is a diagram of a fifth synchronous data detection system 500 in a third and alternate embodiment of the present invention. The fifth system 500 includes an analog front-end 202 that is different from the analog front-end 102 or 103 in the fourth system 400. The analog front-end circuit 202 of the fifth system 500 includes a bypassable high-pass filter 210 (see FIG. 2B) that is controlled by the TA_interval signal from the transient detector 204.

The fifth system 500 thus includes two bypassable high-pass filters 210: one in the analog front-end and the other before the timing 110 and gain 114 controls. Both bypassable high-pass filters 210 have their high-pass filtering switched on during the transient interval (i.e., when the TA_interval is high). The addition of the high pass filtering in the analog front-end 202 substantially removes the effect of the transient on the read-back signal but also distorts the read-back signal.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An apparatus for suppression of transients in a synchronous data detection system comprising:

an analog front-end circuit receiving an analog signal and outputting an amplified signal;

a sampler receiving the amplified signal and outputting a sampled signal;

a shaping circuit receiving the sampled signal and outputting a shaped signal;

a data detector receiving the shaped signal and detecting data in the shaped signal;

a first high-pass filter receiving the shaped signal and outputting a high-pass signal;

a gain control circuit receiving the high-pass signal and controlling the analog front-end circuit using the high-pass signal; and a timing control circuit receiving the high-pass signal and controlling the sampler and the shaping circuit using the high-pass signal.

2. The apparatus in claim 1, wherein the first high-pass filter is bypassable.

3. The apparatus in claim 2, further comprising a transient detector receiving the sampled signal and using the sampled signal to control bypassing of the first high-pass filter.

4. The apparatus in claim 3, wherein the first high-pass filter is switched on when a transient is detected by the transient detector.

5. The apparatus in claim 3, wherein the first high-pass filter is switched on in anticipation of a transient that was previously detected by the transient detector.

6. The apparatus in claim 1, wherein the analog front-end circuit comprises a variable gain amplifier (VGA).

7. The apparatus in claim 6, wherein the analog front-end further comprises a second high-pass filter.

8. The apparatus in claim 7, wherein the second high-pass filter is bypassable.

9. The apparatus in claim 1, wherein the sampler comprises an analog-to-digital converter.

10. The apparatus in claim 1, wherein the sampler comprises a sample-and-hold circuit.

11. The apparatus in claim 1, wherein the shaping circuit comprises a finite impulse response (FIR) filter.

12. The apparatus in claim 1, wherein the data detector comprises a maximum-likelihood sequence detector.

13. The apparatus in claim 1, further comprising a voltage controlled oscillator (VCO) receiving a voltage input from the timing control circuit and outputting an oscillating signal to the sampler and the shaping circuit.

14. A method for robust data detection in a synchronous data detection system comprising:

receiving a signal including a transient in a baseline of the signal;

amplifying the signal under control of a gain control signal to form an amplified signal;

sampling the amplified signal under control of a timing control signal to form a sampled signal;

shaping the sampled signal under control of the timing control signal to form a shaped signal;

recovering data from the shaped signal;

high-pass filtering the shaped signal to form a high-pass version of the shaped signal;

generating the gain control signal using the high-pass version of the shaped signal; and generating the timing control signal using the high-pass version of the shaped signal.

* * * * *